(12) United States Patent
Bailey

(10) Patent No.: US 10,938,148 B2
(45) Date of Patent: Mar. 2, 2021

(54) CABLE MANAGEMENT SYSTEM FOR STORING AND MANAGING AN ADAPTER BOX AND CABLE

(71) Applicant: Logan Bailey, Provo, UT (US)

(72) Inventor: Logan Bailey, Provo, UT (US)

( * ) Notice: Subject to any disclaimer, the term of this patent is extended or adjusted under 35 U.S.C. 154(b) by 0 days.

(21) Appl. No.: 16/021,016

(22) Filed: Jun. 28, 2018

(65) Prior Publication Data
US 2019/0296481 A1 Sep. 26, 2019

Related U.S. Application Data

(63) Continuation of application No. 15/928,060, filed on Mar. 21, 2018, now Pat. No. 10,446,978.

(60) Provisional application No. 62/474,399, filed on Mar. 21, 2017.

(51) Int. Cl.
| | |
|---|---|
| *H01R 13/72* | (2006.01) |
| *H01R 13/62* | (2006.01) |
| *H01R 13/627* | (2006.01) |
| *H02G 11/02* | (2006.01) |
| *B65H 75/40* | (2006.01) |

(52) U.S. Cl.
CPC ......... *H01R 13/6205* (2013.01); *B65H 75/40* (2013.01); *H01R 13/6271* (2013.01); *H01R 13/72* (2013.01); *H02G 11/02* (2013.01); *B65H 2701/31* (2013.01); *B65H 2701/533* (2013.01); *B65H 2701/536* (2013.01)

(58) Field of Classification Search
CPC ............................ H01R 13/72; H01R 13/6205; H01R 13/6271; H01R 11/01; H01R 11/02; H01R 11/20; H01R 11/30

USPC ....................................................... 439/501, 4
See application file for complete search history.

(56) References Cited

U.S. PATENT DOCUMENTS

| | | | |
|---|---|---|---|
| D260,962 S | 9/1981 | Hechler, IV | |
| 4,338,497 A * | 7/1982 | Drew ..................... | H02G 11/02 191/12.4 |
| 4,653,833 A * | 3/1987 | Czubernat .............. | H01R 13/72 191/12.4 |
| 4,653,883 A | 3/1987 | Czubernat | |

(Continued)

OTHER PUBLICATIONS

The Side Winder by Fuse: Wind your charger with ease, posted Sep. 19, 2017, [retrieved Jul. 15, 2020]. Retrieved from Internet, <URL: https://www.kickstarter.com/projects/341336269/the-side-winder-wind-your-macbook-charger-with-eas?ref=discovery&term=The%20Side%20Winder >.

(Continued)

*Primary Examiner* — Hae Moon Hyeon
(74) *Attorney, Agent, or Firm* — Warren M. Pate; Pate Peterson, PLLC

(57) ABSTRACT

A cable management system includes a housing configured to protect and enable easy winding of cables and adapters. The various preferred embodiments utilize a rotating functionality to easily wind both small and large cables, while simultaneously supporting and protecting the cables. A plurality of selectively removable inserts provide for accommodating multiple configurations of cable sizes and locations. The unique design decreases the space typically required to store the adapter, promotes an extended product life for the cable housed within the casing, and can significantly reduce the time needed to wrap and store the cable.

18 Claims, 19 Drawing Sheets

(56) References Cited

U.S. PATENT DOCUMENTS

| | | | | |
|---|---|---|---|---|
| 4,656,320 | A * | 4/1987 | Maddock | H02G 11/02 191/12.4 |
| 4,725,697 | A * | 2/1988 | Kovacik | H02G 11/02 191/12.4 |
| 5,713,758 | A * | 2/1998 | Goodin | H01R 13/639 439/459 |
| D414,431 | S | 9/1999 | Tran | |
| 6,092,826 | A | 7/2000 | Pingel | |
| D451,075 | S | 11/2001 | Hwang | |
| 6,328,243 | B1 | 12/2001 | Yamamoto | |
| 6,349,893 | B1 | 2/2002 | Daoud | |
| 6,369,999 | B1 * | 4/2002 | Wohlgemuth | H01R 33/95 361/111 |
| D461,168 | S | 8/2002 | Liao | |
| D475,608 | S | 6/2003 | Lin | |
| 6,733,328 | B2 * | 5/2004 | Lin | H02G 11/02 439/501 |
| D505,859 | S | 6/2005 | Suzuki | |
| 7,001,210 | B1 * | 2/2006 | Chiang | H01R 13/72 242/378.2 |
| 7,114,603 | B2 * | 10/2006 | Lai | B65H 75/40 191/12.4 |
| 7,438,258 | B2 * | 10/2008 | Chen | B65H 75/14 191/12.2 R |
| D639,190 | S | 6/2011 | Cook | |
| 8,435,041 | B2 * | 5/2013 | Holland | H01R 13/5213 439/142 |
| D748,924 | S | 2/2016 | Walser | |
| 9,260,023 | B2 * | 2/2016 | Ono | H02G 11/02 |
| 9,490,659 | B1 * | 11/2016 | English | H02J 7/0045 |
| D794,555 | S | 8/2017 | Meyerhoffer | |
| 10,446,978 | B2 | 10/2019 | Bailey | |
| D875,508 | S | 2/2020 | Bailey | |
| 2004/0099702 | A1 * | 5/2004 | Conner | A44B 11/005 224/163 |
| 2007/0249196 | A1 * | 10/2007 | Collins | A47B 97/00 439/152 |
| 2012/0295457 | A1 * | 11/2012 | Holland | H01R 13/447 439/142 |
| 2014/0339039 | A1 * | 11/2014 | Ono | B60L 50/66 191/12.4 |
| 2015/0014128 | A1 * | 1/2015 | Mizuno | H02G 11/02 200/51.09 |
| 2018/0277988 | A1 | 9/2018 | Bailey | |

OTHER PUBLICATIONS

Fuse Reel The Side Winder Magsafe, posted Mar 17, 2018, [retrieved Jul. 15, 2020]. Retrieved from Internet, <URL: https://www.amazon.com/Side-Winder-Original-Organizer-Compatible/dp/B07BB8DFBW>.

* cited by examiner

CABLE MANAGEMENT SYSTEM FOR STORING AND MANAGING AN ADAPTER BOX AND CABLE

1. RELATED APPLICATIONS

This application is a continuation of U.S. patent application Ser. No. 15/928,060 filed Mar. 21, 2018 (now U.S. Pat. No. 10,446,978), which claims the benefit of U.S. Provisional Patent Application Ser. No. 62/474,399 filed Mar. 21, 2017.

BACKGROUND OF THE INVENTION

2. Technical Field

The present specification relates to a cable management system for storing and managing an adapter box and cable that can be easily adjusted to different lengths allowing for the user to safely and securely store their cable and adapter box.

3. Background

Various types of devices for organizing cables are known in the art. Usually items such as auxiliary cables, headphone cables, or extension cables can be organized in a reel device. Typically, cable organization tools are spring loaded or manually powered to wind cables around a central wheel. However, these reels cannot hold laptop-charging cables due to the large power adaptor located in the center of the cable. Usually, laptop users are forced to wind the bulky cables directly around the adapter box, causing bulk, and oftentimes fraying the cables at the base. Some organizing tools allow for the users to wind cables through tracks on the outside of the adapter by individually winding each cable by hand. This method is tedious, untimely, and does not hold the cables in place very well. Other devices are spring loaded. These springs are extremely bulky, not suited for travel, and again cannot account for the large adapter box on laptop cables.

Current technologies include a clip-on design that requires manual removal of a rubber cover, manual winding, and reapplication of the rubber. Furthermore mobile laptop users are looking for speed, protection, portability, and cable length management when the distance to the wall outlets vary. There is a need for a cable management tool that can protect cables while winding, improve length control, and allow users to quickly store laptop cables.

BRIEF SUMMARY OF THE INVENTION

Aspects disclosed herein relates to a cable management system for storing an adapter box, and a cable. A cable management system can be used for wrapping and protecting cables, prevent tangling and damaging of cables and adapter. Usually if cables are left unprotected the cable can fray and tangle. When a charger is repeatedly wound and unwound, the cables will oftentimes fray over time, and it is difficult to maintain a tight and orderly wind. The disclosed invention operates by inserting a third party adapter or power source into a shell or constructing revolving rings around an adapter. Once the cables are fed through the guide holes, the main adapter mount can be spun independent of an outer shell, guiding and laying down the cables. The main adapter mount is designed to hold the cables in place to eliminate bending and fraying at the adapter.

In the most preferred embodiments of the present invention, the cable management system comprises an upper shell, a lower shell, and a ring. The upper shell can comprise of a plurality of holes, and an upper adapter mount. A lower shell can comprise of a lower cable track, a plurality of holes, and a lower adapter mount. An upper shell can further comprise an upper cable track, an upper input cable holder, an upper output cable holder, and an upper ring track. An upper shell, and a lower shell can be connected or attached together through a plurality of holes forming one piece with a track for a ring to rotate around in. An upper ring can further comprise a cable shell, a ring input cable guide, a ring output cable guide, and an upper clip.

In another embodiment a cable management system can comprise of an upper ring, a lower ring, an upper adapter mount, and a lower adapter mount. An upper ring can comprise an upper cable shell, a ring input cable guide, a ring output cable guide, and a grip handle. An upper ring can further comprise a cable shell, a ring input cable guide, a ring output cable guide, and an upper clip. A cable shell can encapsulate a cable and allow for the cable to rotate around an upper adapter mount, and a lower adapter mount.

BRIEF DESCRIPTION OF THE DRAWINGS

The various preferred embodiments of the present invention will hereinafter be described in conjunction with the appended drawings, wherein like designations denote like elements, and.

DETAILED DESCRIPTION OF THE PREFERRED EMBODIMENTS

The embodiments of the invention described herein are not intended to be exhaustive or to limit the invention to precise forms disclosed. Rather, the embodiments selected for description have been chosen to enable one skilled in the art to practice the invention.

Generally, an embodiment in accordance with the invention can comprise a cable management system that includes an upper shell and a lower shell that can move dependent of each other, and a ring that moves independently of the upper shell and the lower shell. A ring can have a ring grip, a large cable running hole, and a small cable running hole.

Figure 1:
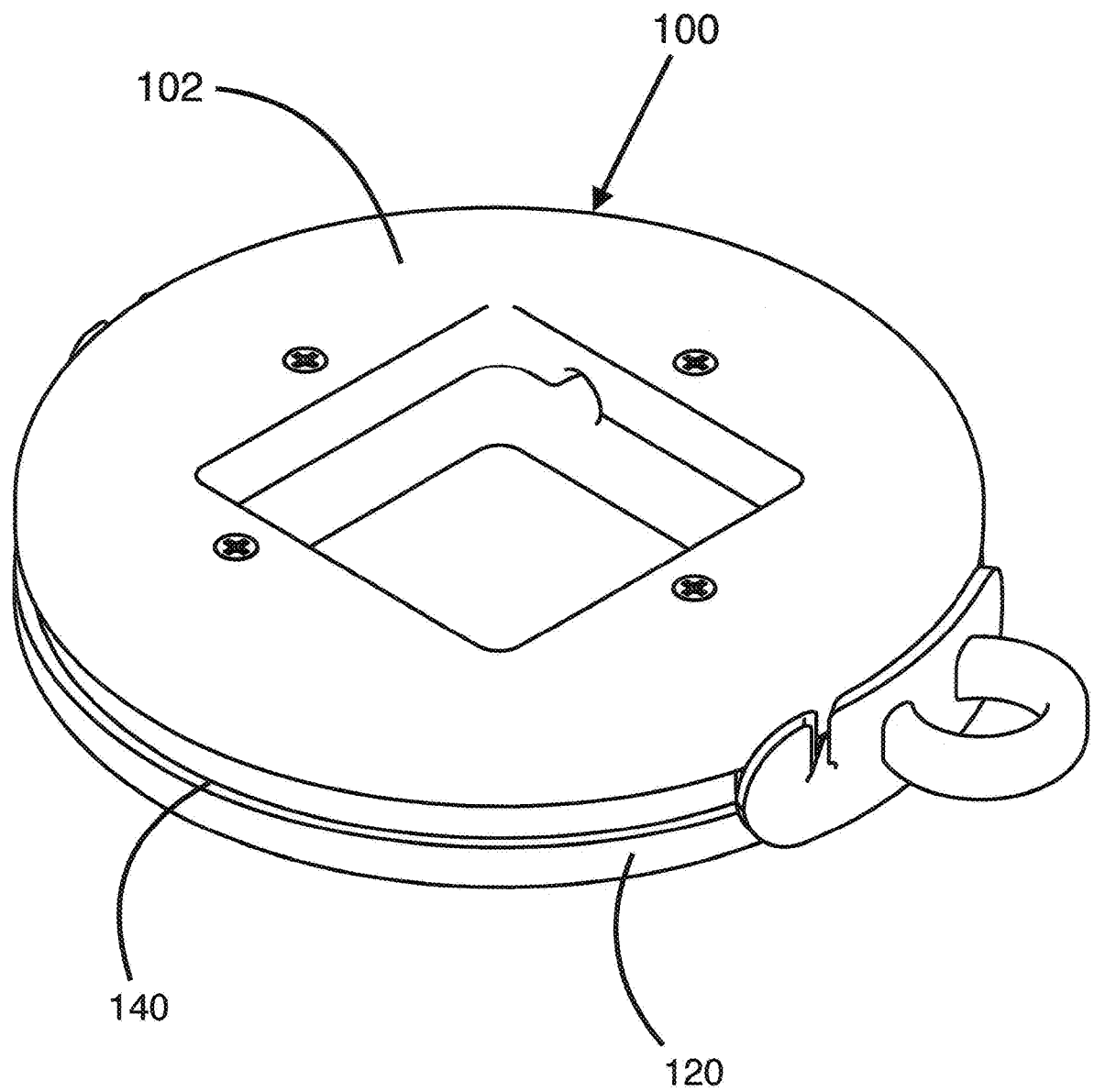
FIG. 1 shows an isometric view of a cable management system in accordance to one, or more embodiments.
Figure 2:
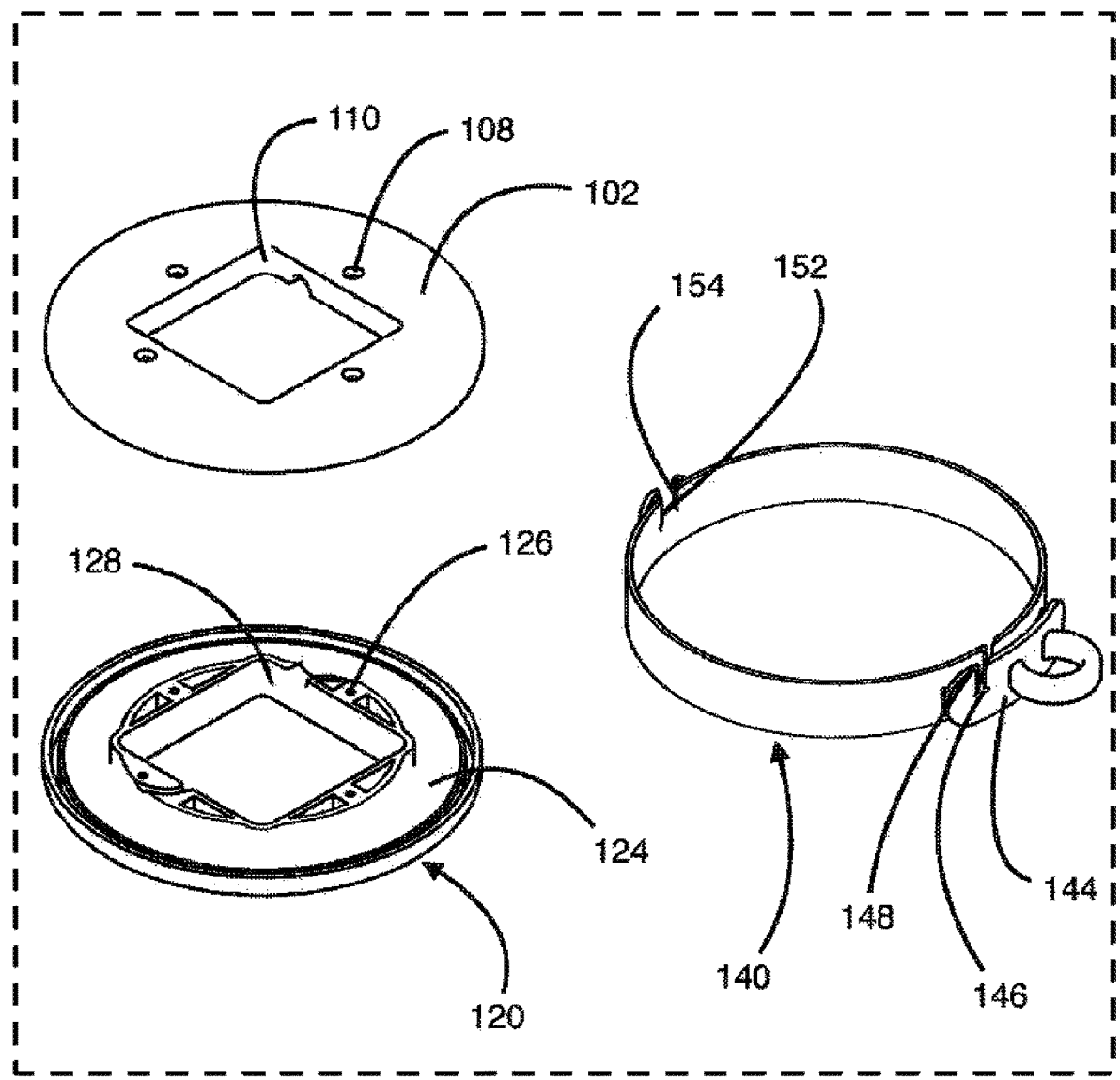
FIG. 2 shows an exploded isometric view of a cable management system in its in accordance to one, or more embodiments.

Referring now to FIG. 1, and FIG. 2, an isometric view of a cable management system, and an exploded isometric view of a cable management system, is shown generally at 100. At least one preferred embodiment of the present invention comprises an upper shell 102, a lower shell 120, and a ring 140. In embodiments an upper shell 102 can comprise of a plurality of holes 108, and an upper adapter mount 110. Upper adapter mount 110 can extrude vertically downward from the upper surface of the upper shell 102. Upper adapter mount 110 can be such as, for example circular, square, rectangular, or the like. An upper adapter mount 110 can contain, or encapsulate a power supply, a power adapter, a USB adapter, a USB-C power adapter, or the like.

In embodiments a ring 140 can comprise an outer track bracket 144, a small cable running hole 146, a small cable insert hole 148, a large cable support 152, and a large cable insert hole 154. An outer track bracket 144 can be attached to and extend horizontally from a ring 140, and can have a ring grip 156 attached to and extending horizontally from it. In embodiments a outer track bracket 144 can have a small cable running hole running through it, which can be such as, for example, a slot, a hole, a slit, a groove, a channel, or the like. A small cable insert hole 148 can be cut into vertically from either the top or the bottom of a ring 140. A small cable insert hole 148 can be such as, for example, a slot, a hole, a slit, a groove, a channel, or the like. A small cable insert hole 148 can align with, or can be positioned diagonal to a small cable running hole 146, which can allow for a cable, rope, wire, or rod pass through from the outside of the ring 140 to the inside of the ring.

In certain preferred embodiments of the present invention, a lower shell 120 can comprise of a lower cable track 124, a plurality of holes 126, and a lower adapter mount 128. A lower shell can have a plurality of holes 126 spaced equally, or unequally apart around an inner portion of the lower shell aligning with the plurality of holes 108 of the upper shell 120 allowing for the two pieces to be removably attached to each other. A lower adapter mount 128 can extrude vertically downward from the upper surface of the lower shell 120. A lower adapter mount 128 can be such as, for example circular, square, rectangular, or the like. An lower adapter mount 128 can contain, or encapsulate a power supply, a power adapter, a USB adapter, a USB-C power adapter, or the like. A lower adapter mount 128 can contact, or connect with an upper adapter mount 110 to form a capsule, envelope, or enclosure (i.e., a structure defining or having a power-adapter opening therewithin). In certain embodiments a lower adapter mount 128, and an upper adapter mount 110 can be square, circular, rectangular, octagonal, or the like in shape to accommodate a variety of power adapter shapes and sizes. In embodiments a ring 140 can slide and/or rotate independently of an upper shell 102, and a lower shell 120.

Figure 3:
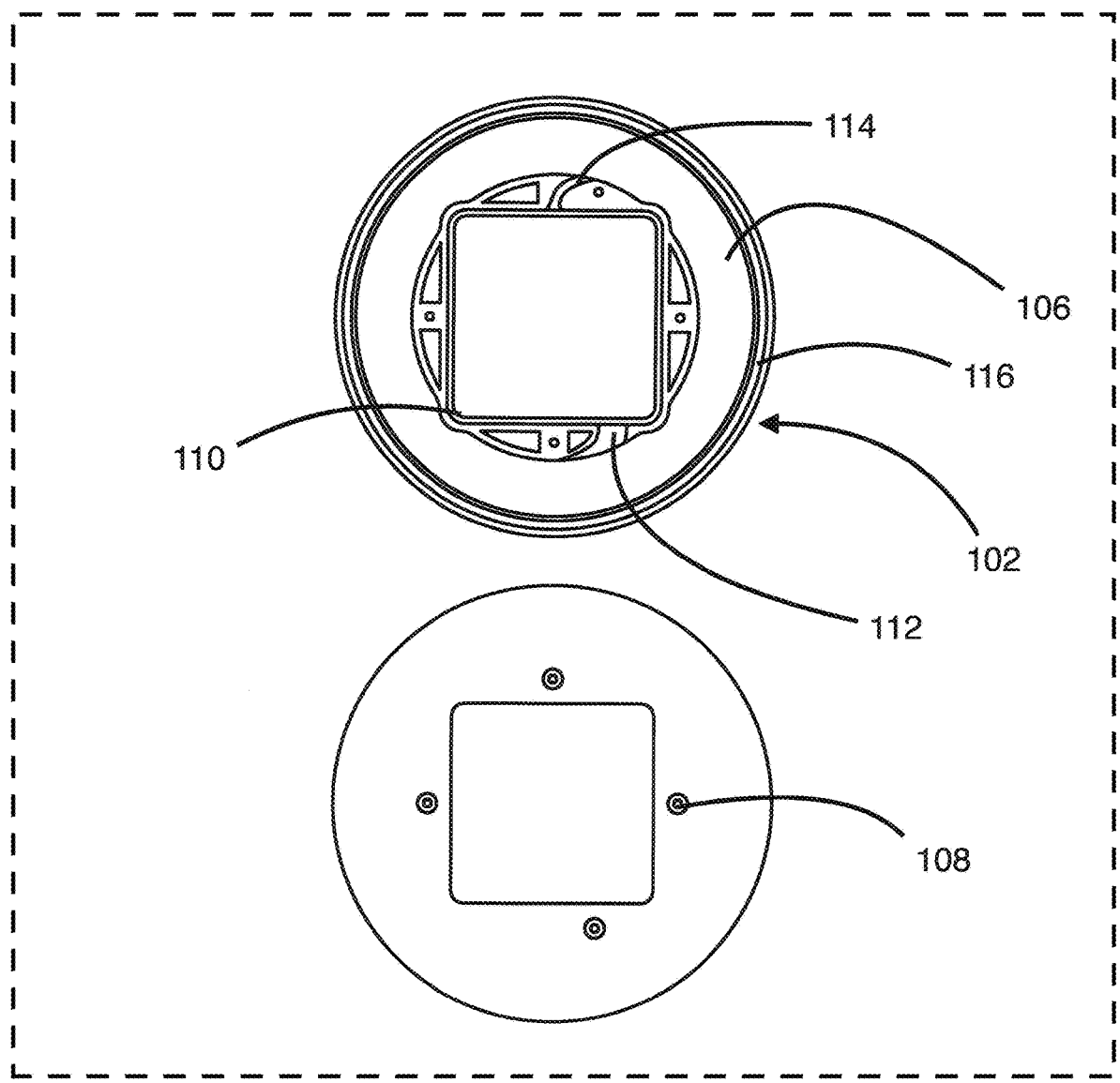
FIG. 3 shows a top and bottom view of the upper shell of a cable management system in accordance to one, or more embodiments.

Referring now to FIG. 3, a top and bottom view of upper shell 102 is presented. In embodiments an upper shell 102 can further comprise an upper cable track 106, an upper input cable holder 112, an upper output cable holder 114, and an upper ring track 116. Upper cable track 106 may be, for example, a circular, square, rectangular, or octagonal shape allowing for a cable to be wrapped around the inner diameter or inner portion of the upper cable track. In certain preferred embodiments of the present invention, upper cable track 106 can be recessed into upper shell 102. An upper input cable holder 112 can extend from the upper adapter mount 110 to the upper cable track 106 allowing for a cable to pass through it.

Upper input cable holder 112 can be a semi-circular in shape starting small and gradually increasing in size as it extends from upper adapter mount 110, to upper cable track 106. In certain embodiments of the present invention, upper ring track 116 may be surrounded by two walls a first upper wall and a second upper wall extending vertically, where one can extend vertically from the outer diameter of an upper shell 102, and the other wall can extend offset of the outer diameter forming a channel or track. In embodiments upper output cable holder 114 can extend from the upper adapter mount 110 to an upper cable track 106 allowing for a cable to pass through it. An upper output cable holder 114 can be a semi-circular in shape starting small and gradually increasing in size as it extends from the upper adapter mount 110, to the upper cable track 106.

Figure 4:
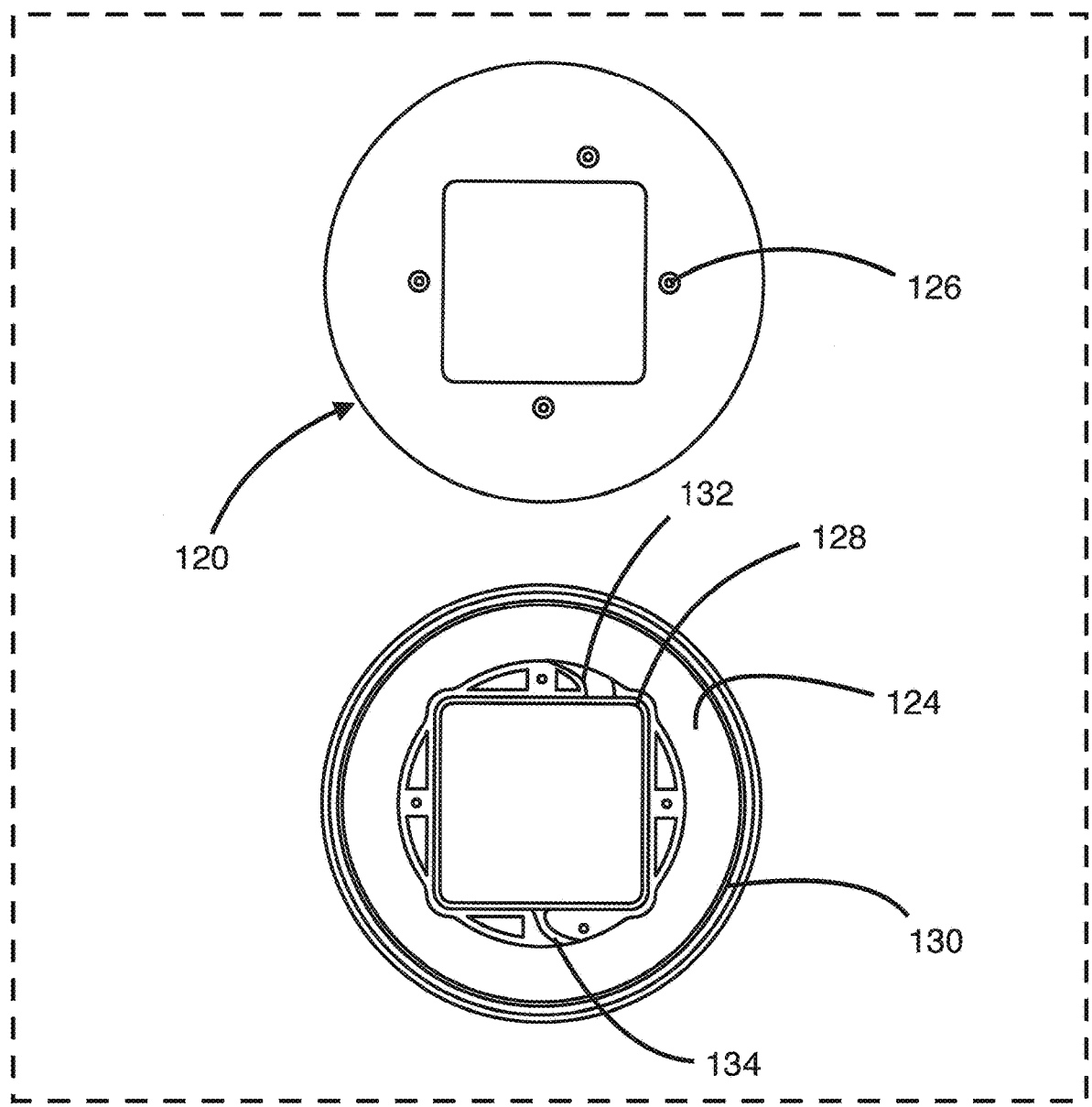
FIG. 4 shows a top and bottom view of the lower shell of a cable management system in accordance to one, or more embodiments.

Referring now to FIG. 4, a top and bottom view of the lower shell 120 is depicted. In certain preferred embodiments of the present invention, a lower shell 120 can further comprise a lower ring track 130, lower input cable holder 132, and a lower output cable holder 134. A lower input cable holder 132 can extend from the lower adapter mount 128 to the lower cable track 124 allowing for a cable to pass through it. A lower input cable holder 132 can be a semi-circular in shape starting small and gradually increasing in size as it extends from the lower adapter mount 128, to the upper cable track 106. In certain embodiments a lower input cable holder 132 can be a semi-circle, half a triangle, half a rectangle, or the like. Lower input cable holder 132 can have a first end and a second end where the first end is smaller than the second end, or the first end can be larger than the second end, or the first end and the second end are the same size. In certain preferred embodiments of the present invention, a lower ring track 130 may be surrounded by two walls a first lower wall and a second lower wall extending vertically, where the first wall can extend vertically from the outer diameter of lower shell 120, and the second wall can be offset of the outer diameter forming a channel or track.

In certain preferred embodiments of the present invention, upper shell 102, and lower shell 120 can be connected or attached together through a plurality of holes 108, 126 forming one piece with a track for a ring 140 to rotate around in. In certain embodiments an upper shell 102 and a lower shell 120 can be connected together by bolts, screws, pins, glue, plastic snaps, or the like.

Figure 5:
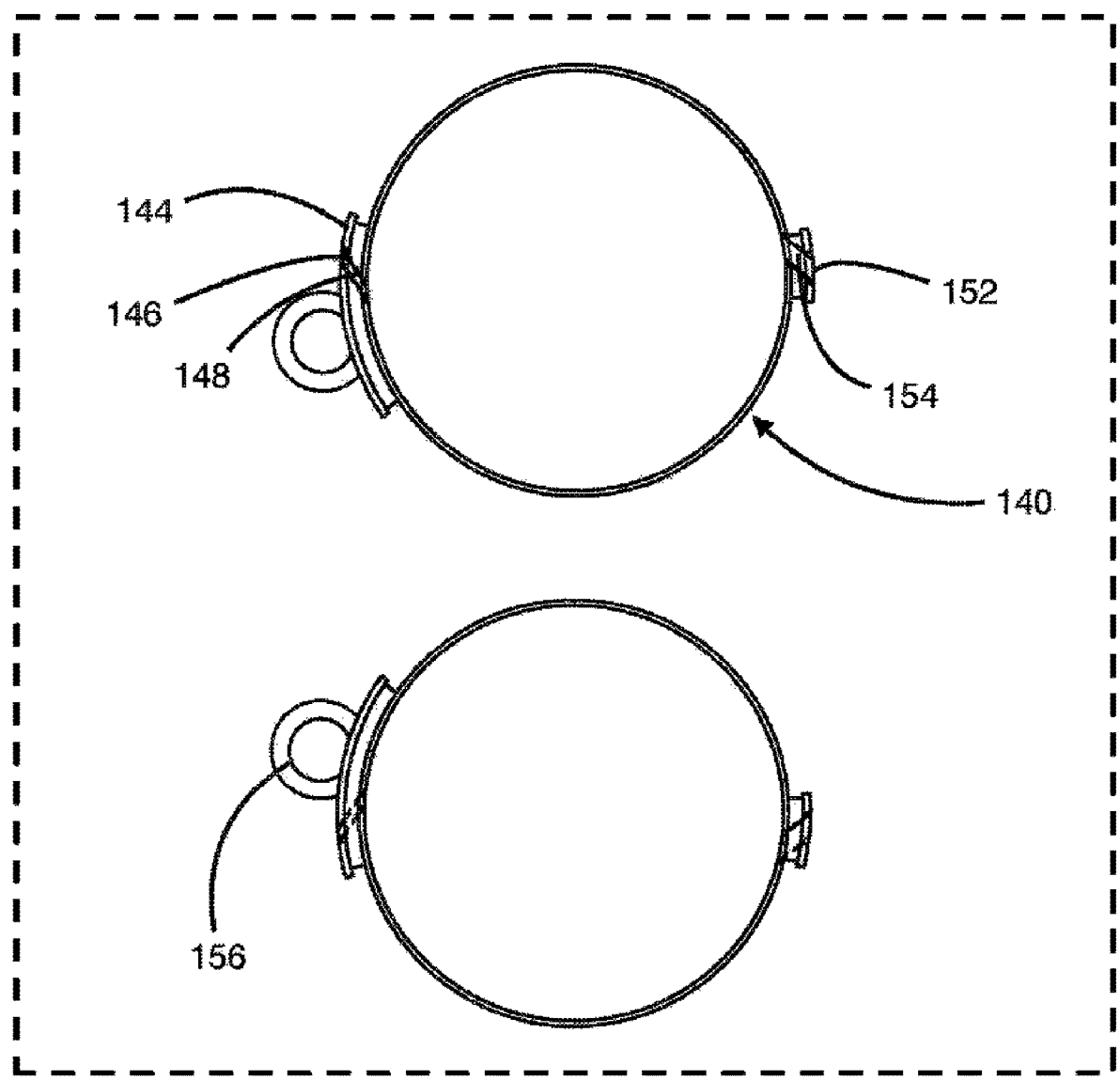
FIG. 5 shows a top and bottom view of a ring track for a cable management system in accordance to one, or more embodiments.

Referring now to FIG. 5, a top and bottom view of a ring track 116 is depicted. In embodiments a large cable support 152 can be attached to a ring 140. A large cable support 152 can be such as, for example, circular, square, rectangular, or the like in shape allowing a cable to pass through into an upper shell 102, and a lower cable track 124, which can help prevent a cable from bending or twisting. In certain embodiments a large cable support 152 can be a slot, cut, slit or the like. A large cable insert hole 154 can pass through a large cable support 152, and can allow for a cable to pass through from lower cable track 124 to the outside of the ring 140 allowing for the user to have access to the cable. In certain embodiments a large cable insert hole 154 can be a thru hole, or a cutout that can be circular, square, rectangular, or the like in shape.

In certain preferred embodiments of the present invention, a ring grip 156 can be attached to an outer track bracket 144, which can extend horizontally from the outer track bracket 144. A ring grip 156 can be circular, square, rectangular, or the like in shape allowing the user to easily handle and grip an upper shell 102, a lower shell 120, and a ring 140. A ring 140 can be placed in and between an upper ring track 116, and lower ring track 130 allowing the ring to rotate smoothly within the track. Outer track bracket 144 can be permanently or removably attached to a ring 140 and can have a small cable running hole 146 extending outwards from on its bottom or top surface. Outer track bracket 144 can be offset and follow the path of a ring 140, allowing for a small gap between the outer track bracket and the ring.

Figure 6:
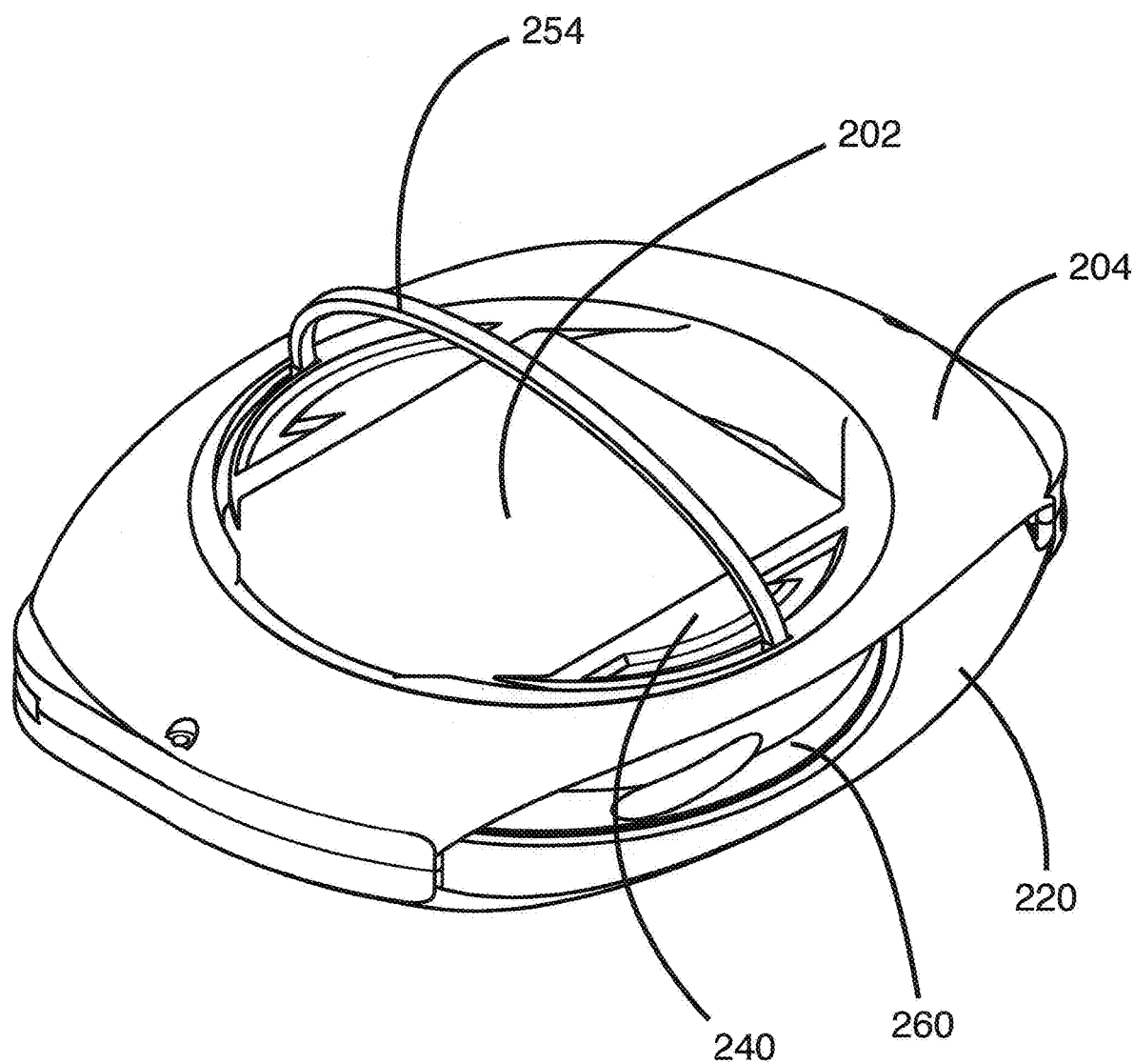
FIG. 6 shows a isometric front view of a cable management system in accordance to one, or more embodiments.
Figure 7:
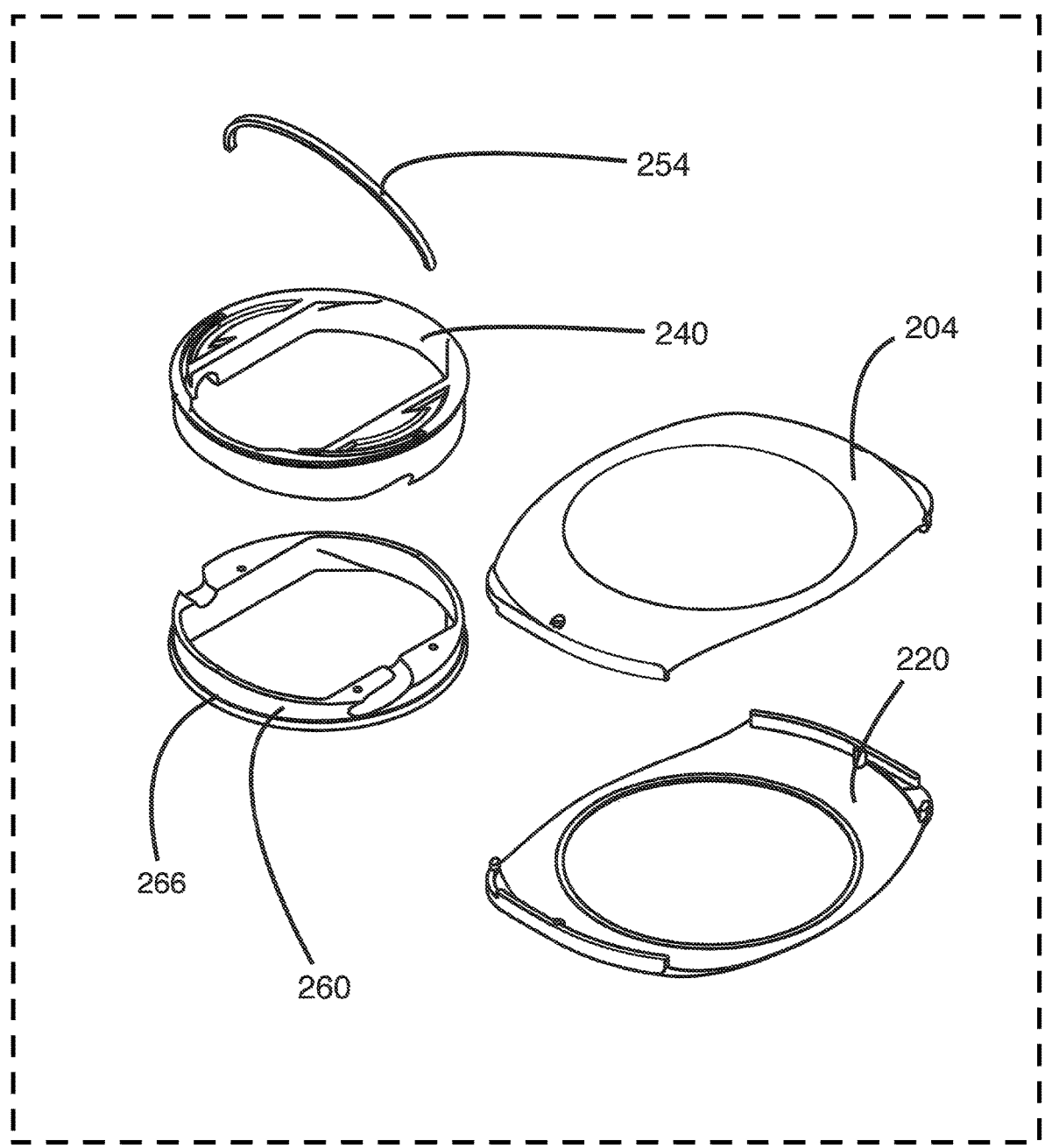
FIG. 7 shows an exploded isometric view of a cable management system in its in accordance to one, or more embodiments.
Figure 8:
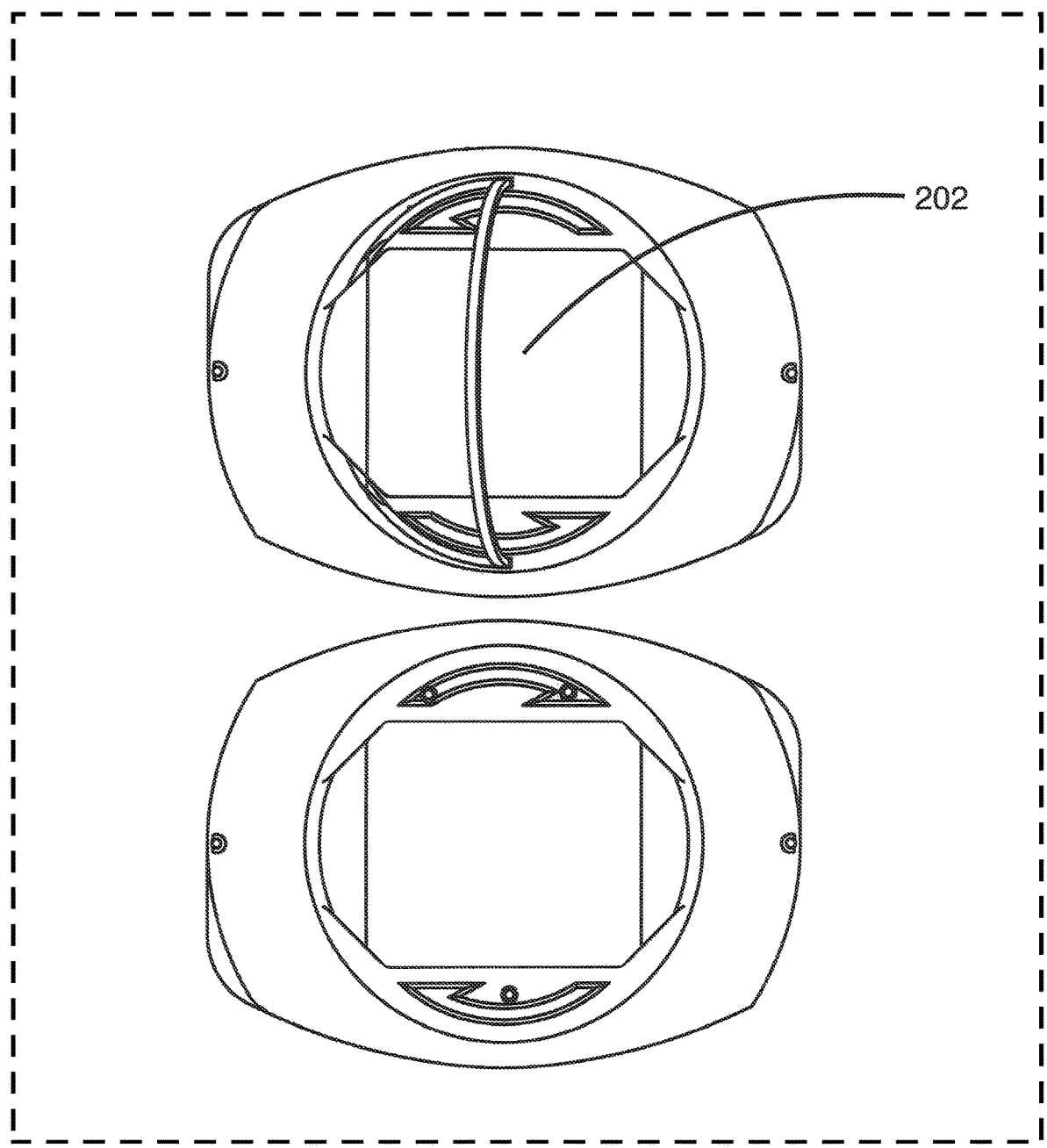
FIG. 8 shows a top and bottom view of a cable management system in accordance to one, or more embodiments.

Referring now to FIG. 6, FIG. 7, and FIG. 8, an alternate embodiment of a cable management system showing a top and bottom view and an exploded isometric view is depicted. In certain preferred embodiments of the present invention, a cable management system can comprise of an upper ring 204, a lower ring 220, an upper adapter mount 240, and a lower adapter mount 260. An upper ring 204 can comprise an upper cable shell 208, a ring input cable guide 210, a ring output cable guide 212, and a grip handle 254. An adapter 202 can be placed between an upper ring 204, and a lower ring 220 with its cables being routed out through a first and a second opening, which can allow for a cable to be easily wound around a lower adapter mount 260, and an upper adapter mount 240. In embodiments a upper ring 204, a upper adapter mount 240, a lower ring 220, and a lower adapter mount 260 can be removably attached together encapsulating an adapter and its input and output cables.

Figure 9:
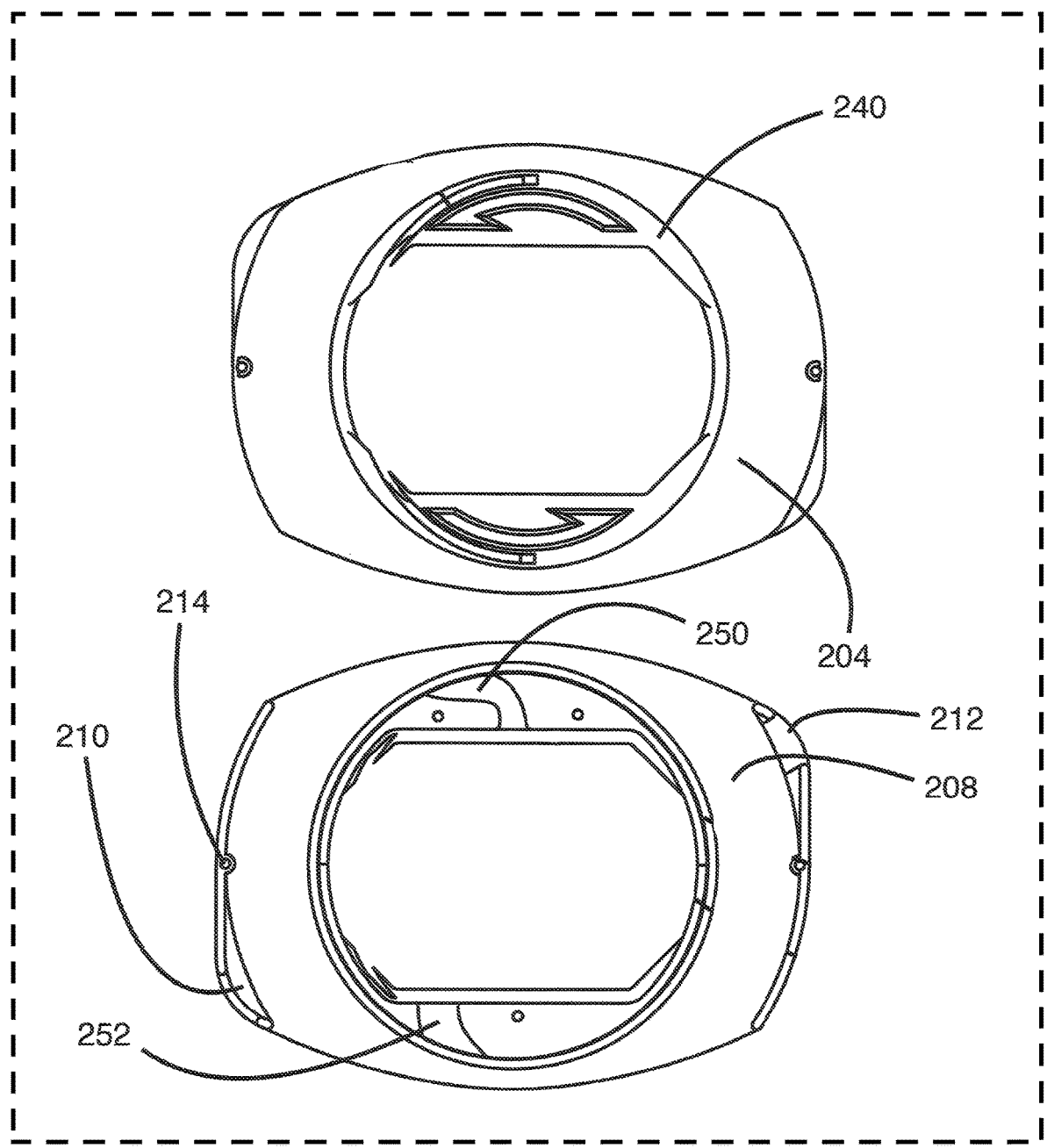
FIG. 9 shows a top and bottom view of the upper adapter mount and upper ring of a cable management system in accordance to one, or more embodiments.
Figure 10:
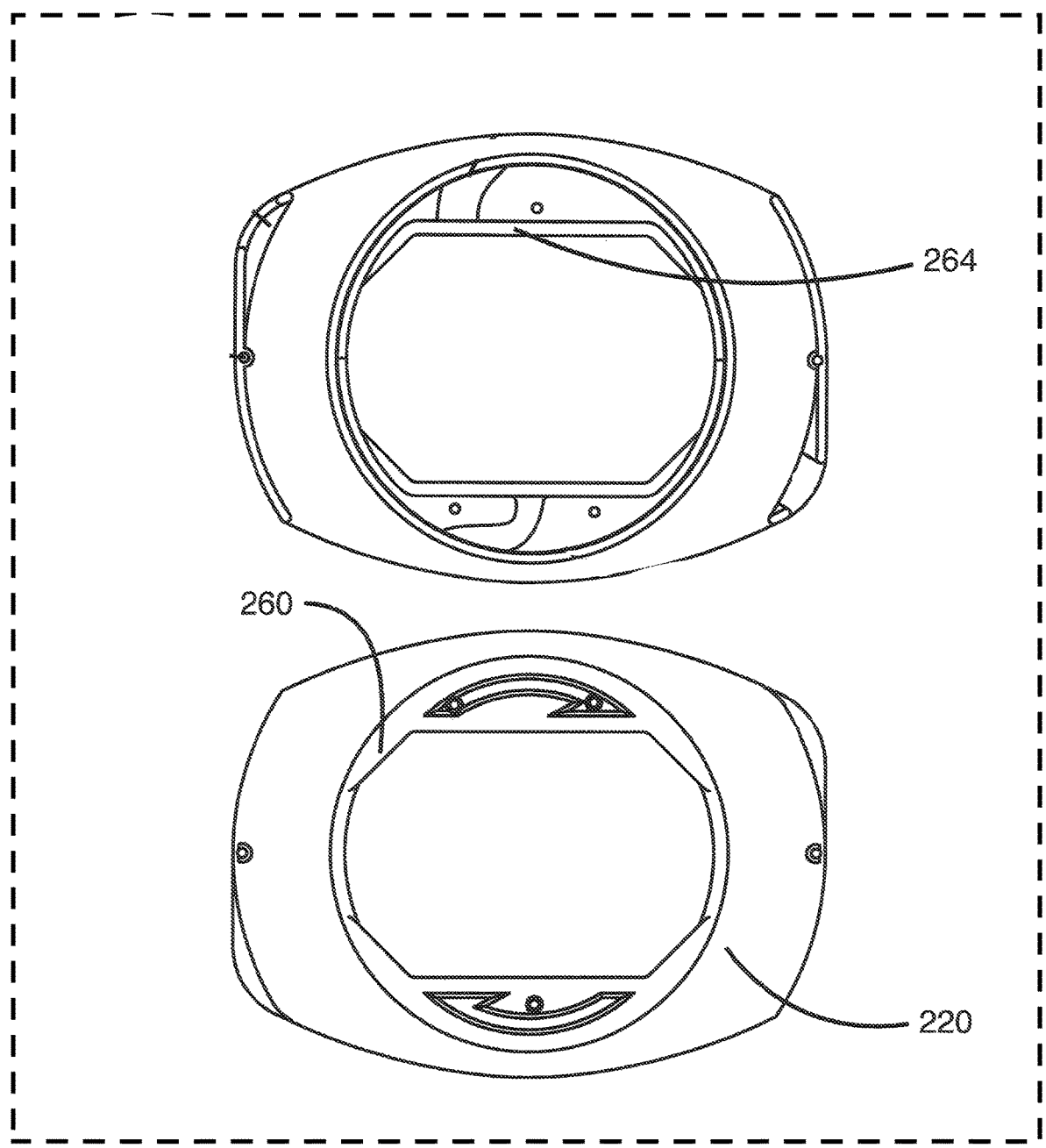
FIG. 10 shows a top and bottom view of the lower adapter mount and lower ring of a cable management system in accordance with at least one preferred embodiment of the present invention.

Referring now to FIG. 9 and FIG. 10, a top and bottom view of the upper adapter mount and upper ring of an alternate configuration of a cable management system in accordance with a preferred embodiment of the present invention is depicted. In embodiments an upper ring 204 can further comprise a cable shell 208, a ring input cable guide 210, a ring output cable guide 212, and an upper clip 214. Cable shell 208 can encapsulate a cable and allow for the cable to rotate around an upper adapter mount 240, and a lower adapter mount 260. In certain preferred embodiments of the present invention, an upper adapter mount 240 comprises an upper ring track, an adapter output guide 250, and an adapter input guide 252. A lower adapter mount 260 can have a lower ring track, and a lower adapter mount 260. An upper adapter mount 240, and a lower adapter mount 260 can be two pieces, or in certain embodiments can be one piece. In certain preferred embodiments of the present invention, a lower ring 220 and an upper ring 204 can encapsulate a upper adapter mount 240, and a lower adapter mount 260 which can allow for the upper adapter mount 240, and the lower adapter mount 260 to rotate freely inside of the lower and upper ring. A cable can wrap itself around a lower ring and an upper ring as the user rotates upper adapter mount 240 and lower adapter mount 260.

Figure 11:
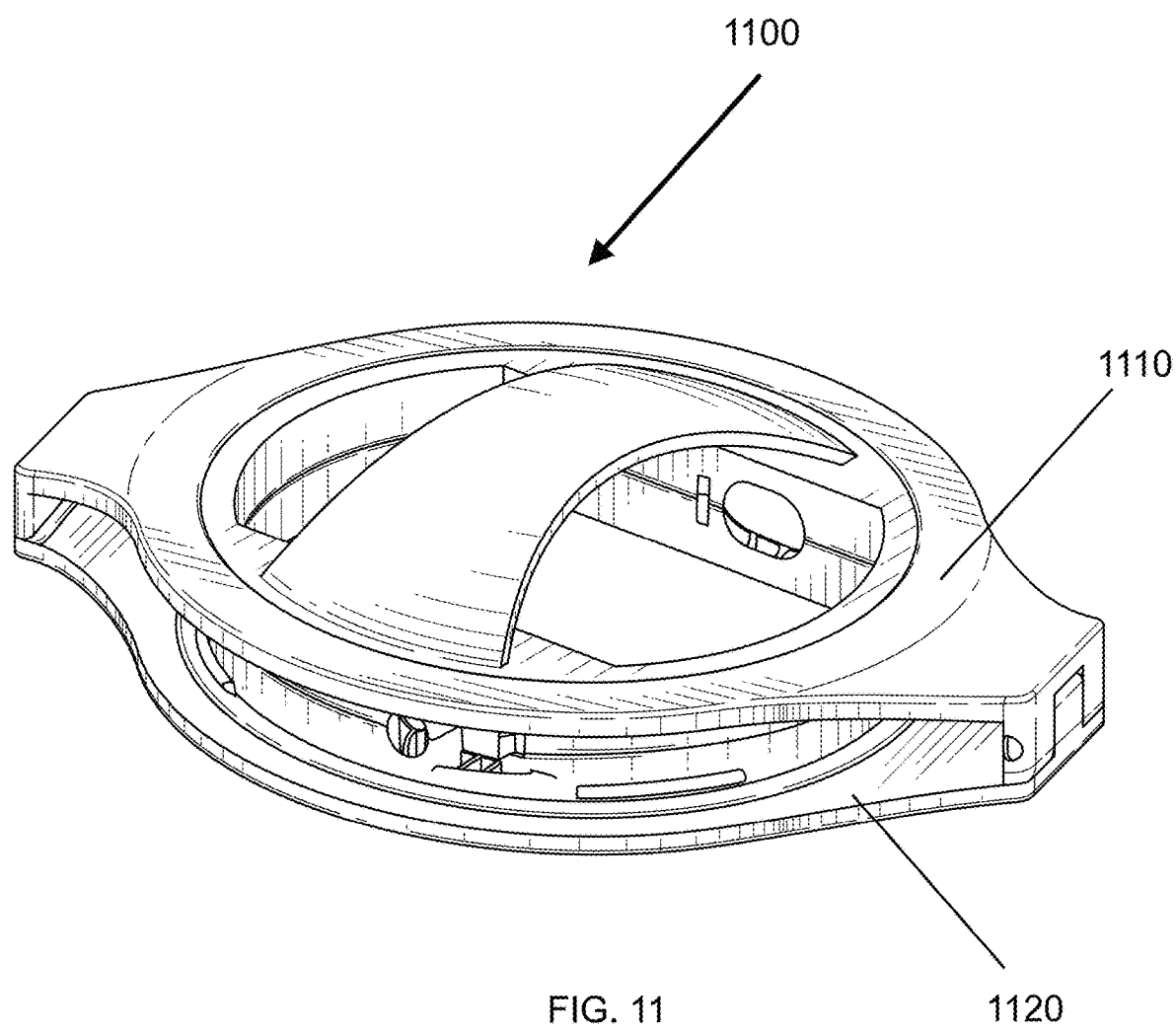
FIG. 11 is a top perspective view of a cable management system in accordance with an alternative preferred embodiment of the present invention.

Referring now to FIG. 11, a top perspective view of a cable management system 1100 in accordance with an alternative preferred embodiment of the present invention is depicted. Cable management system 1100 and the various components are manufactured from any suitable material such as durable plastic and the like. Other materials that are strong, lightweight, and easily used in injection molding process may also be selected. Those skilled in the art will recognize that there are a wide variety of suitable materials.

Cable management system 1100 most preferably comprises a substantially circular top shell 1110 and a substantially circular bottom shell 1120. The substantially circular shape is considered to be the most protective shape since the cables of the charger or power adapter inserted into cable management system 1100 will be wound around the channel created when substantially circular top shell 1110 and a substantially circular bottom shell 1120 are joined together.

Figure 12:
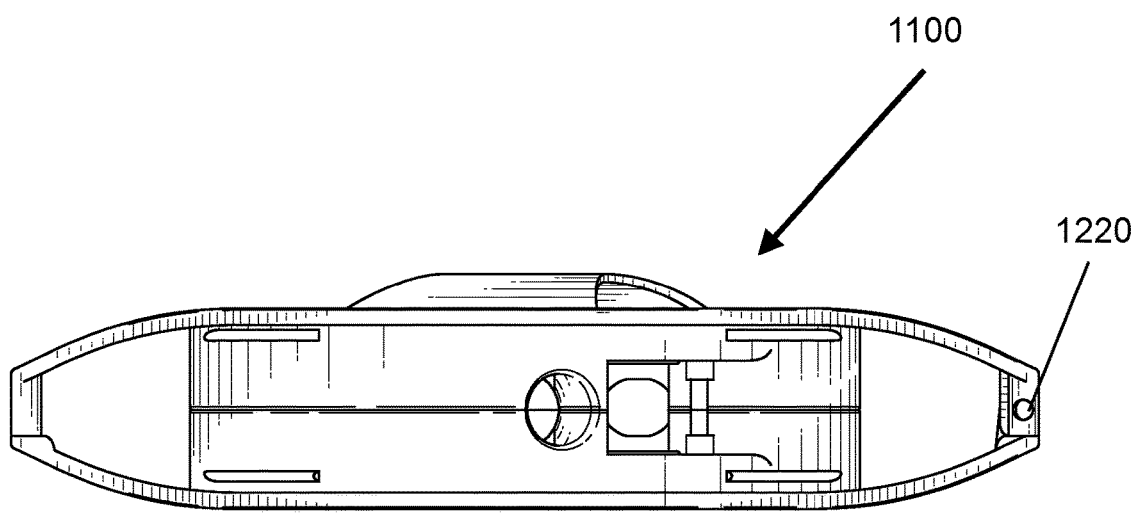
FIG. 12 is a front side view of a cable management system in accordance with an alternative preferred embodiment of the present invention.

Referring now to FIG. 12, a front side view of cable management system 1100 of FIG. 11 is depicted.

Figure 13:
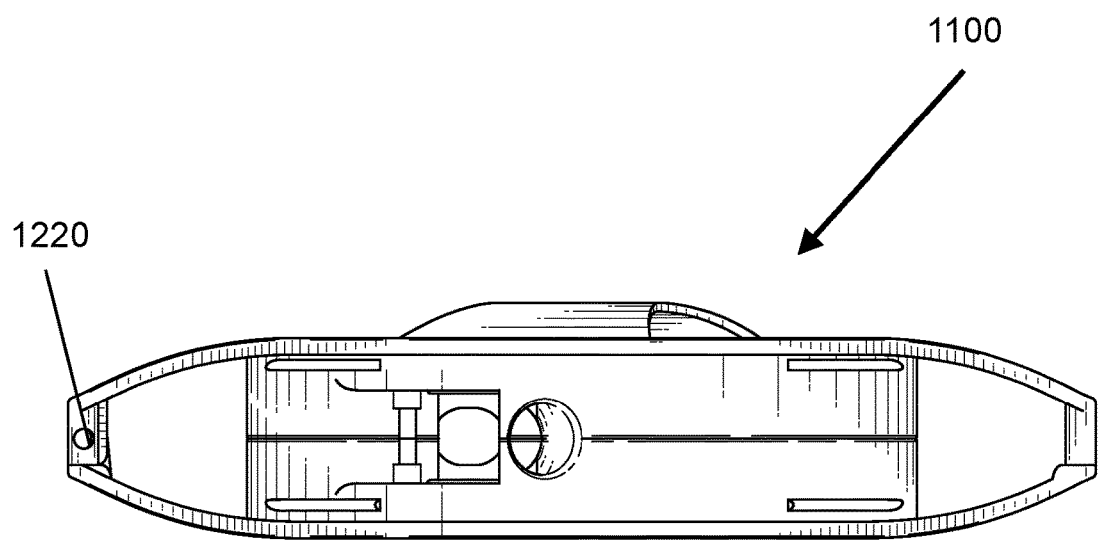
FIG. 13 is a rear side view of a cable management system in accordance with an alternative preferred embodiment of the present invention.

Referring now to FIG. 13, a rear side view of cable management system 1100 of FIG. 11 is depicted.

Figure 14:
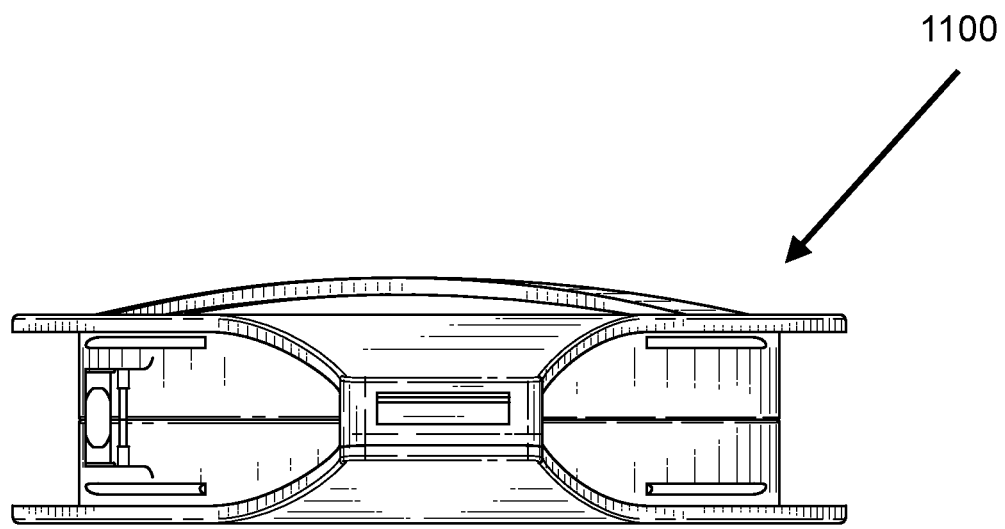
FIG. 14 is a left side view of a cable management system in accordance with an alternative preferred embodiment of the present invention.

Referring now to FIG. 14, a left side view of cable management system 1100 of FIG. 11 is depicted.

Figure 15:
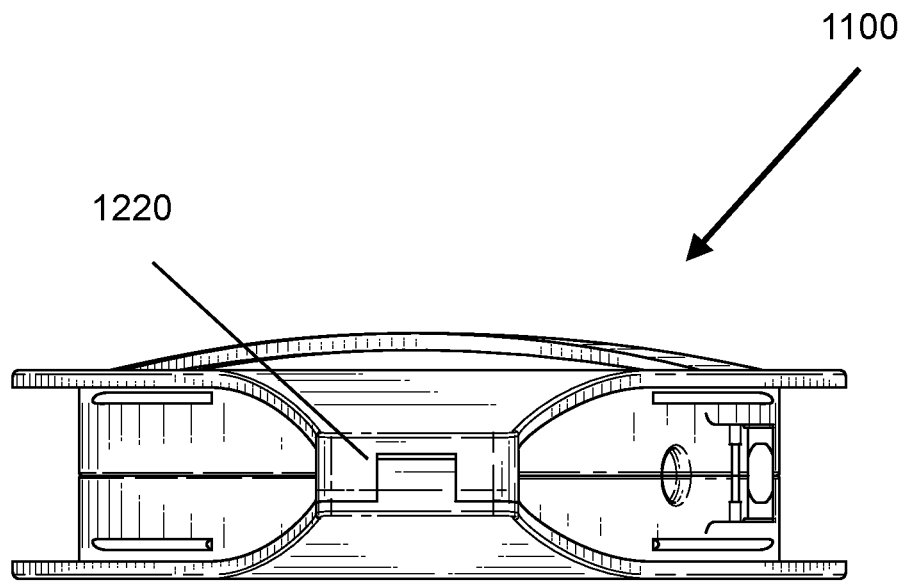
FIG. 15 is a right side view of a cable management system in accordance with an alternative preferred embodiment of the present invention.

Referring now to FIG. 15, a right side view of cable management system 1100 of FIG. 11 is depicted.

Figure 16:
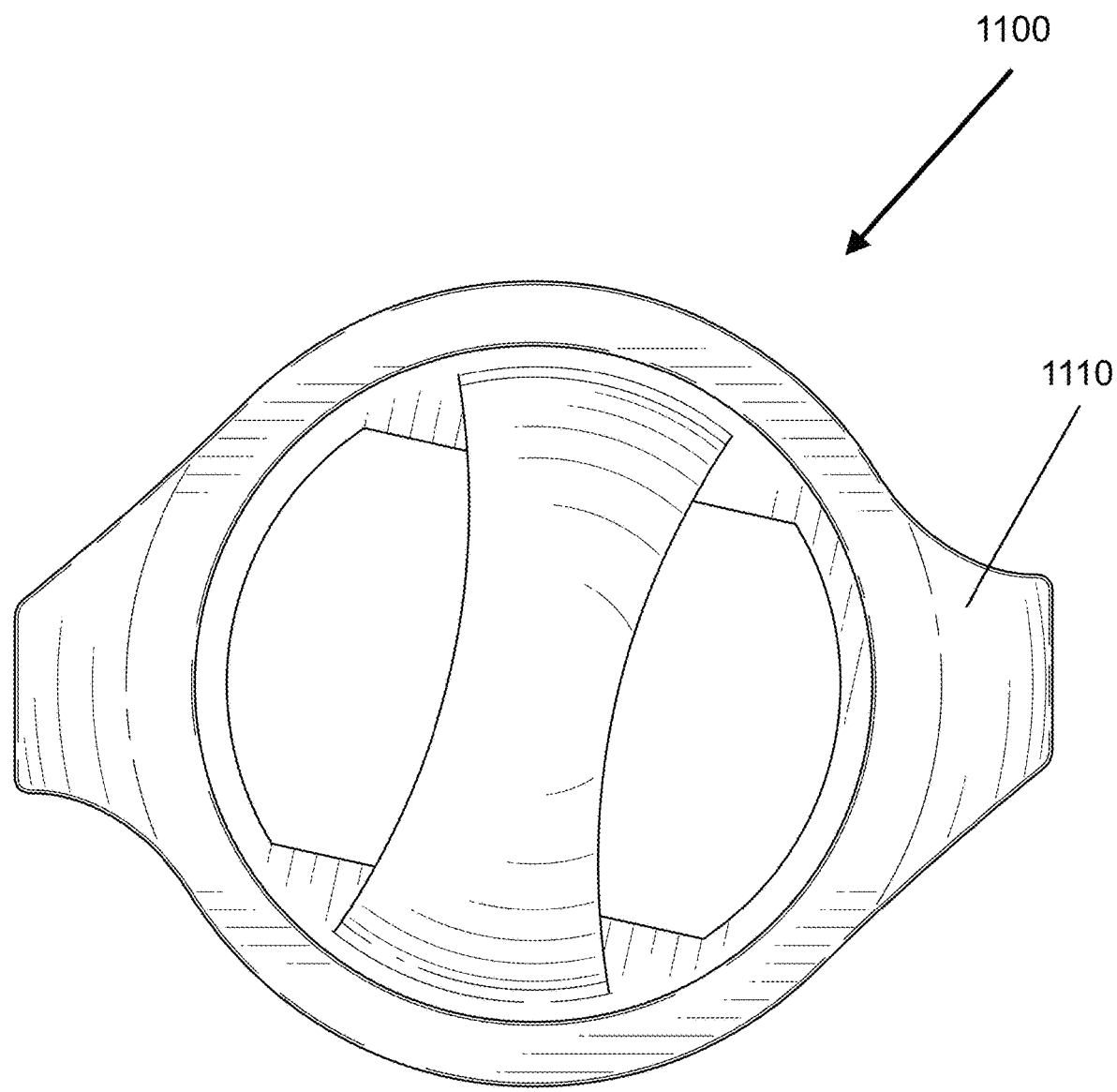
FIG. 16 is a top view of a cable management system in accordance with an alternative preferred embodiment of the present invention.

Referring now to FIG. 16, a top view of the cable management system of FIG. 11 is depicted.

Figure 17:
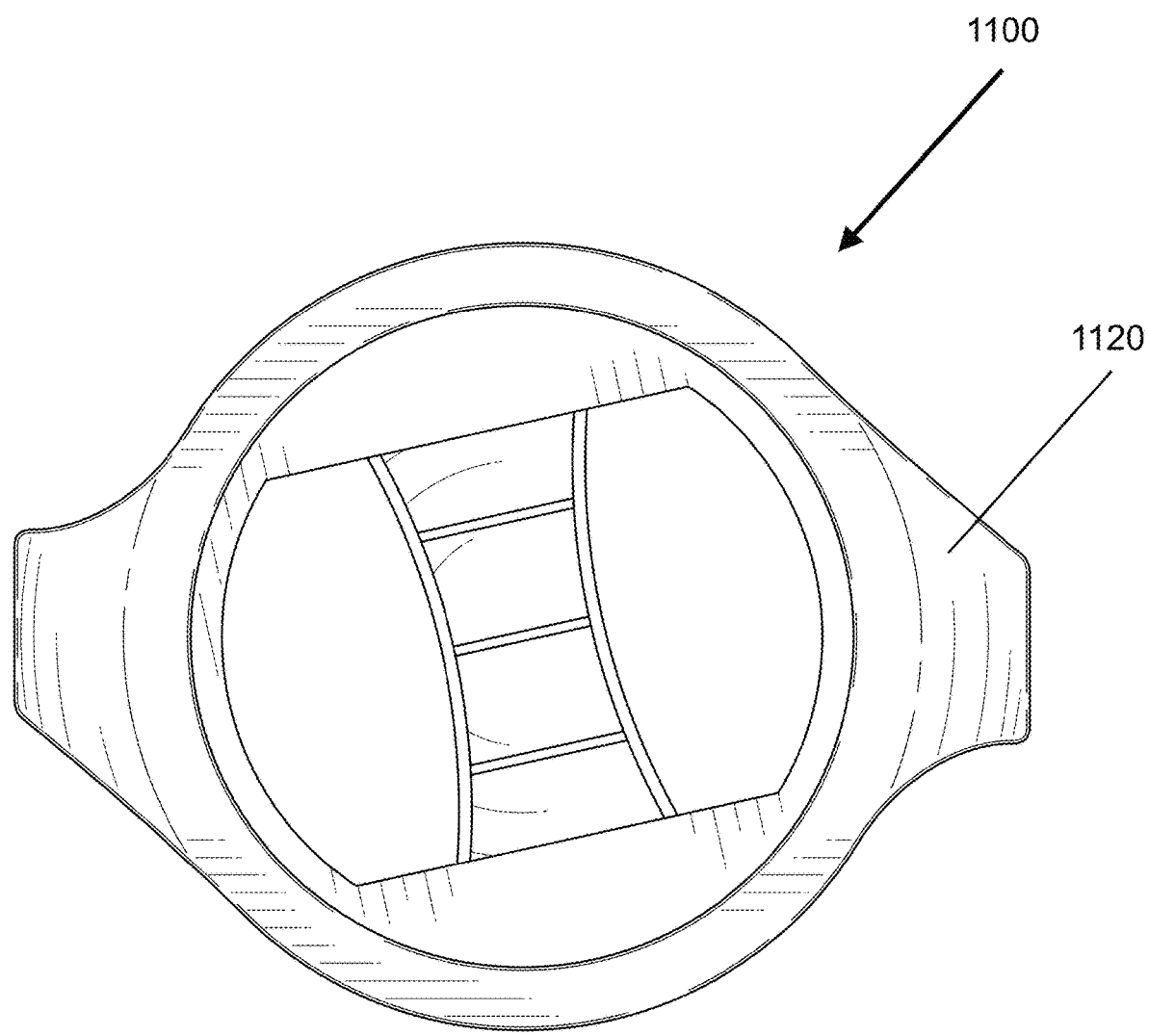
FIG. 17 is a bottom view of a cable management system in accordance with an alternative preferred embodiment of the present invention.

Referring now to FIG. 17, a bottom view of cable management system 1100 of FIG. 11 is depicted.

Figure 18:
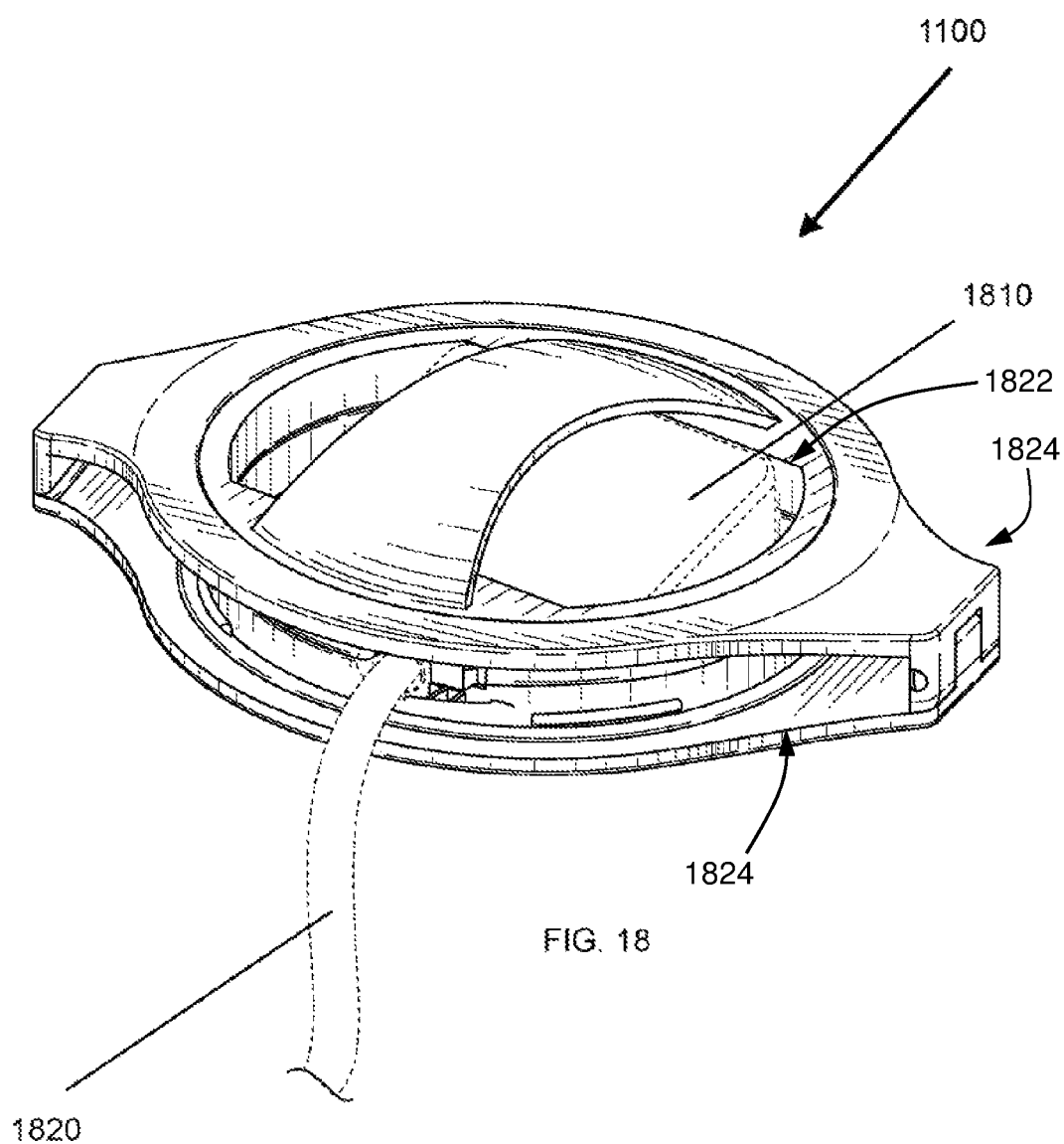
FIG. 18 is a top perspective view of a cable management system in accordance with an alternative preferred embodiment of the present invention, with a power adaptor and cord (shown in dashed lines) positioned within the cable management system.

Referring now to FIG. 18, a top perspective view of cable management system 1100 of FIG. 11 is depicted, with a power adaptor 1810 and associated cord 1820 (shown in dashed lines) positioned within cable management system 1100. The power adaptor 1810 is depicted as being positioned within a power-adaptor opening 1822 of cable management system 1100. The cord 1820 is depicted as extending out of cable management system 1100 through one of two cable apertures 1824 (one on each side) defined by the top and bottom shells 1110, 1120 when the top and bottom shells 1110, 1120 are in a closed position.

Figure 19:
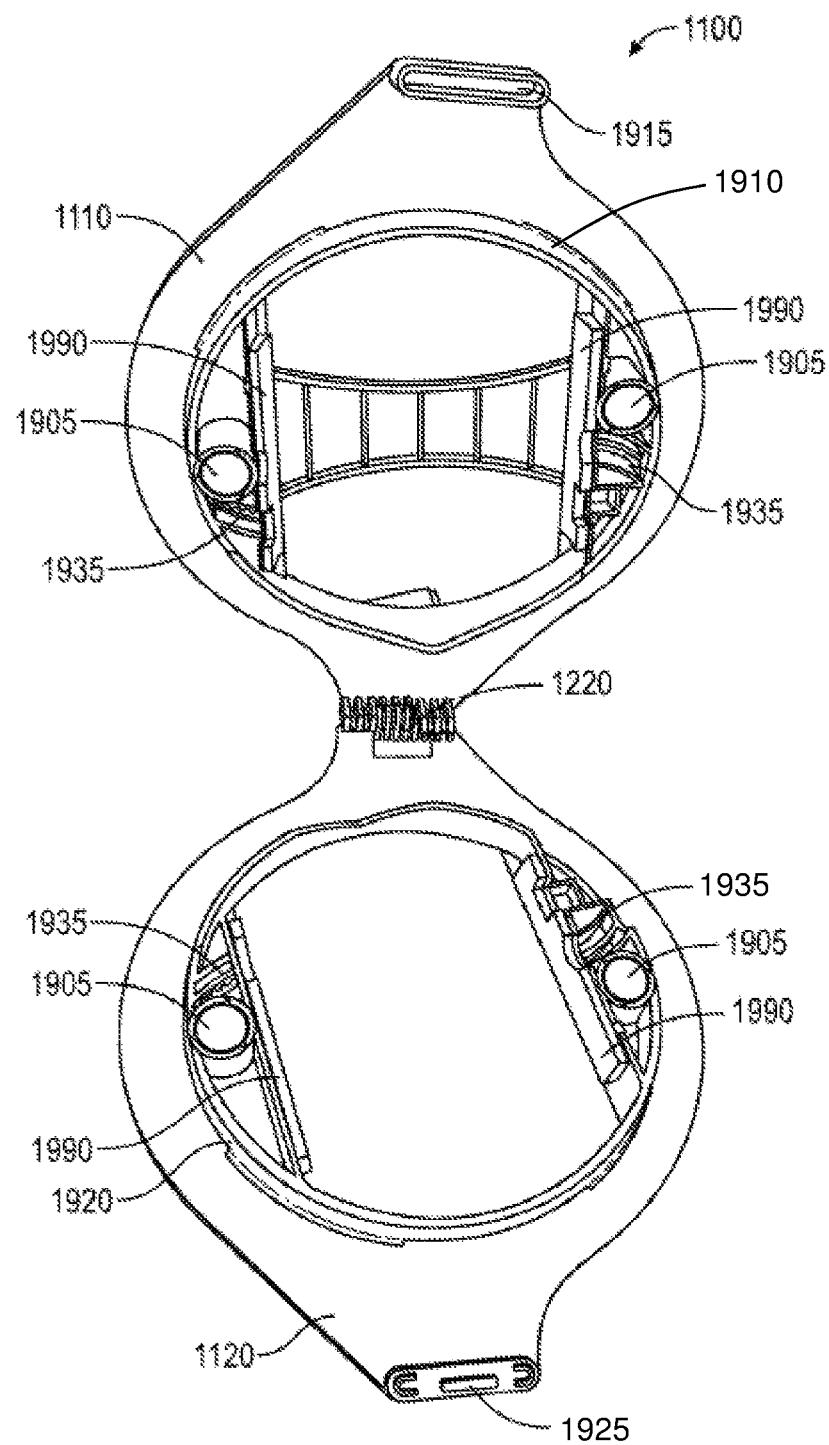
FIG. 19 is a perspective view of the interior of cable management system in accordance with a preferred embodiment of the present invention.

Referring now to FIG. 19, a perspective view of the interior of cable management system 1100 is depicted. As shown in FIG. 19, cable management system 1100 comprises: a hinge mechanism 1220; a plurality of cooperating magnets 1905; top latch mechanism 1915; bottom latch mechanism 1925; a substantially circular top rotating ring 1910; a substantially circular bottom rotating ring 1920; and a plurality of removable inserts 1990.

Additionally, each of top shell 1110 and bottom shell 1120 comprise a pair of cooperating magnets 1905. Working in conjunction with top latch portion 1915 and bottom latch portion 1925, which are connected by hinge mechanism 1220, cooperating magnets 1905 serve to attract top shell 1110 and bottom shell 1120 together, thereby holding top shell 1110 and bottom shell 1120 in a closed position. Top latch portion 1915 and bottom latch portion 1925 have cooperating tab and insert portions that "lock" top shell 1110 and bottom shell 1120 together.

An important part of cable management system 1100 is the inclusion of substantially circular top rotating ring 1910 and substantially circular bottom rotating ring 1920. These two rotating rings are attached to but rotate independent of top shell 1110 and bottom shell 1120. The rotational movement of rotating ring 1910 and bottom rotating ring 1920 within top shell 1110 and bottom shell 1120 urge the cable for a charger to wind around a channel formed by top shell 1110 and bottom shell 1120, thereby storing the cable in an easy to implement fashion. This provides for effective and efficient cable management.

Removable inserts removable inserts 1990 cooperate with cable channels 1935 to control the movement of cables for a charger placed inside cable management system 1100. As shown in FIG. 18, a charger is placed inside cable management system 1100 (i.e., placed within a power-adapter opening 1822 of cable management system 1100) by separating top shell 1110 and bottom shell 1120 using hinge mechanism 1220. The electrical cables used in conjunction with the charger exit from the interior space formed by top shell 1110 and bottom shell 1120 and exit via cable channels 1935 (i.e., via two cable apertures 1935).

Figure 20:
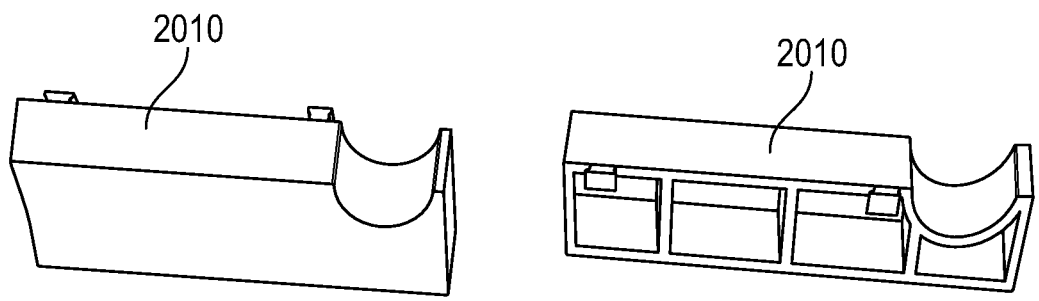
FIG. 20 and FIG. 21 are perspective views of removable inserts suitable for use in conjunction with the preferred embodiments of the present invention.
Figure 21:
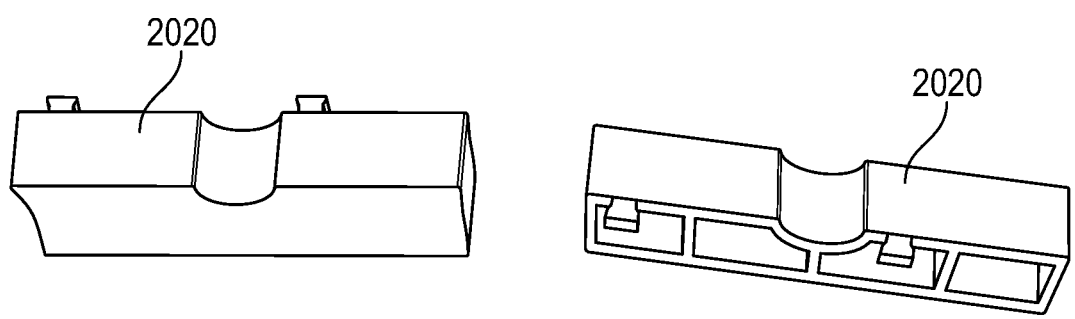

Referring now to FIG. 20 and FIG. 21, a plurality of additional removable inserts 2010 and 2020, suitable for use in conjunction with cable management system 1100 are depicted. In the most preferred embodiments of cable management system 1100, removable inserts 2010 and 2020 are provided to accommodate different sizes/thicknesses and positioning of the cords that are used in conjunction with the power adapter or charger that is inserted into cable management system 1100. Removable inserts 2010 and 2020 serve to change the size of the openings and cable channels 1935 by presenting a different profile.

As shown in FIG. 20 and FIG. 21, removable inserts 2010 and 2020 are placed into top shell 1110 and bottom shell 1120 in order to accommodate various sizes and configurations of cables. Removable inserts 2010 and 2020 are held in place by tabs that are inserted into openings formed in top shell 1110 and bottom shell 1120.

For example, the various versions of the Apple®MacBook® may be shipped with a 45W MagSafe® charger, a 60W MagSafe® charger, a 61W USB-C charger, an 85W MagSafe® charger, or an 87W USB-C charger. Each of these options requires a slightly different configuration of the cable passageways and openings for cable management system 1100. By using different removable inserts such as removable inserts 1990 and/or removable inserts 2010 and 2020, cable management system 1100 may be quickly and easily configured to accommodate multiple chargers at no additional cost. This allows the user of cable management system 1100 to upgrade their computer and charger and still use the same cable management system 1100.

Figure 22:
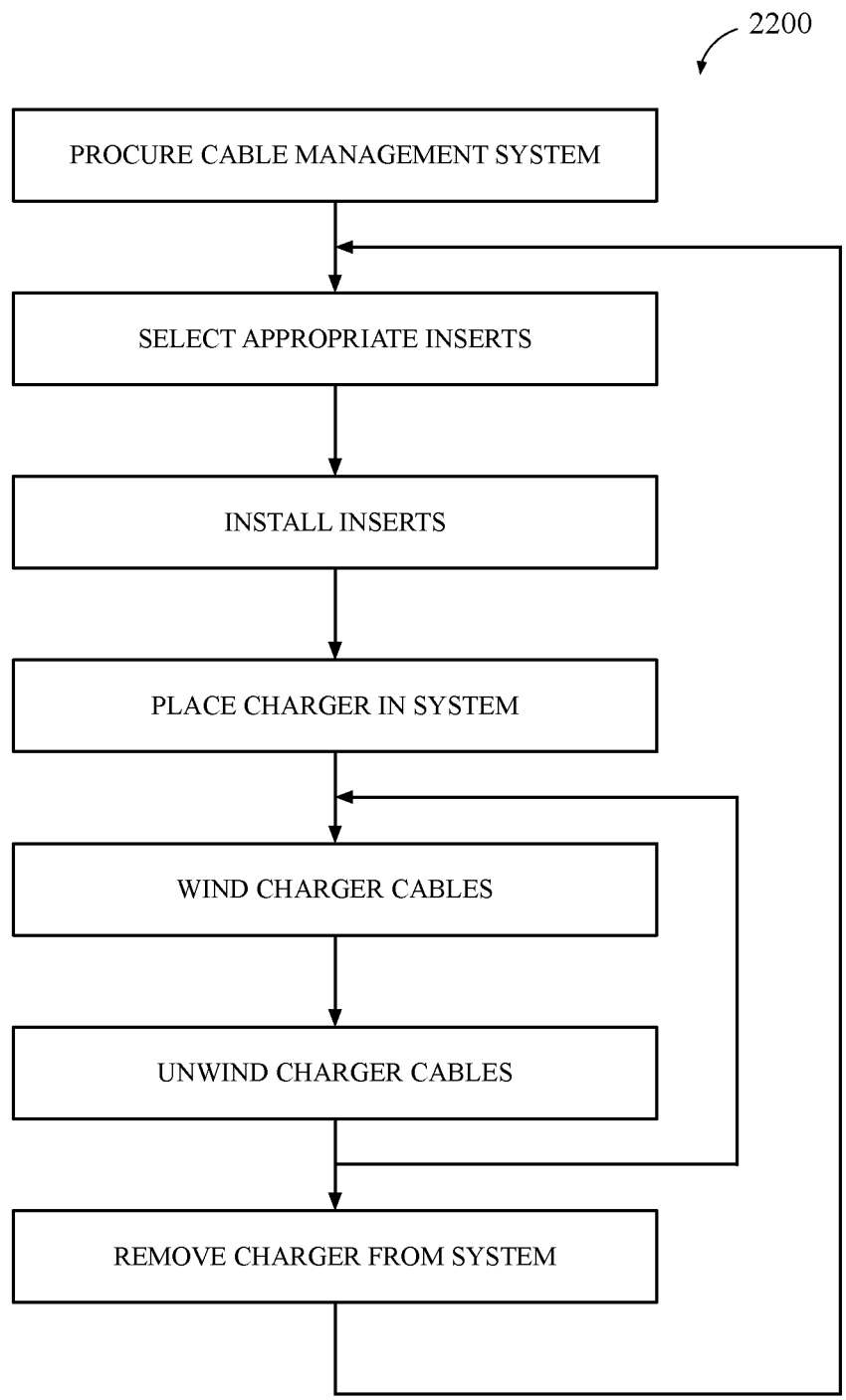
FIG. 22 is a flow chart of a method for using a cable management system in accordance with a preferred embodiment of the present invention.

Referring now to FIG. 22, a method 2200 for using a cable management system in accordance with a preferred exemplary embodiment of the present invention is depicted.

In closing, it is to be understood that although aspects of the present specification are highlighted by referring to one or more specific embodiments, those skilled in the art will readily appreciate that these disclosed embodiments are only illustrative of the principles of the subject matter disclosed herein. Therefore, it should be understood that the disclosed subject matter is in no way limited to a particular methodology, protocol, and/or material, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present disclosure, which is defined solely by the claims. Accordingly, embodiments of the present disclosure are not limited to those precisely as shown and described.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the disclosure are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the disclosed embodiments (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present disclosure and does not pose a limitation on the scope of the embodiments otherwise claimed. No language in the present specification should be construed as indicating any non-claimed element essential to the practice of the disclosed embodiments.

The invention claimed is:

1. A cable-management system comprising:
a shell portion;
a rotating portion selectively rotatable with respect to the shell portion;
the rotating portion having a power-adapter opening therewithin;
one or more removable inserts selectively setting a size of the power-adapter opening;
the shell portion and the rotating portion cooperating with one another to form a cable channel that encircles the power-adapter opening;
the rotating portion comprising first and second cable apertures connecting the power-adapter opening with the cable channel; and
the shell portion comprising third and fourth cable apertures connecting the cable channel with an environment surrounding the cable-management system.

2. The cable-management system of claim 1, wherein the shell portion extends around a circumference of the rotating portion.

3. The cable-management system of claim 2, wherein the shell portion comprises a top shell and a bottom shell.

4. The cable-management system of claim 3, wherein the shell portion further comprises a connection mechanism selectively connecting the top shell to the bottom shell.

5. The cable-management system of claim 4, wherein the rotating portion comprises:
a rotating top rotatably connected to the top shell;
a rotating bottom rotatably connected to the bottom shell;
the rotating top cooperating with the rotating bottom to define the power-adapter opening.

6. The cable-management system of claim 5, wherein the connection mechanism comprises a hinge pivotably connecting the top shell to the bottom shell and enabling the top shell to pivot with respect to the bottom shell between an open position and a closed position.

7. The cable-management system of claim 6, wherein the connection mechanism further comprises a latch selectively securing the top shell to the bottom shell when the top shell is in the closed position with respect to the bottom shell.

8. The cable-management system of claim 1, further comprising a power-delivery system comprising a power adapter, a first electrical cable extending from the power adapter, and a second electrical cable extending from the power adapter, wherein:
the power adapter is positioned within the power-adapter opening;
the first electrical cable extends through the first and third cable apertures; and
the second electrical cable extends through the second and fourth cable apertures.

9. The cable-management system of claim 8, wherein the first and second electrical cables extend into the cable channel and wrap around the power-adapter opening.

10. A system comprising:
a power-delivery system comprising a power adapter, a first electrical cable extending from the power adapter, and a second electrical cable extending from the power adapter;
a cable-management system comprising
a shell portion,
a rotating portion selectively rotatable with respect to the shell portion,
the rotating portion defining a power-adapter opening therewithin,
the shell portion and the rotating portion cooperating with one another to define a cable channel that encircles the power-adapter opening, and
the rotating portion comprising first and second cable apertures connecting the power-adapter opening with the cable channel;
the cable-management system storing the power-delivery system therewithin such that the power adapter is contained within the power-adapter opening and the first and second electrical cables extend respectively through the first and second cable apertures and into the cable channel; and
one or more removable inserts selectively setting a size of the power-adapter opening to fit the power adapter.

11. The cable-management system of claim 10, wherein the first and second electrical cables wrap around the power-adapter opening.

12. The cable-management system of claim 10, wherein:
the shell portion comprises third and fourth cable apertures connecting the cable channel with an environment surrounding the cable-management system;
the first electrical cable extends through the third cable aperture; and
the second electrical cable extends through the fourth cable aperture.

13. The cable-management system of claim 10, wherein:
the first electrical cable extends through the third cable aperture and out into the environment surrounding the cable-management system; and
the second electrical cable extends through the fourth cable aperture and out into the environment surrounding the cable-management system.

14. The cable-management system of claim 10, wherein:
the rotating portion comprises a rotating top and a rotating bottom; and
the rotating top and the rotating bottom cooperate with one another to define the power-adapter opening.

15. A method of cable management, the method comprising:
obtaining a power-delivery system comprising a power adapter, a first electrical cable extending from the power adapter, and a second electrical cable extending from the power adapter;
obtaining a cable-management system comprising
a shell portion,
a rotating portion selectively rotatable with respect to the shell portion,
one or more removable inserts,
the rotating portion defining a power-adapter opening therewithin,
the one or more removable inserts selectively setting a size of the power-adapter opening,
the shell portion and the rotating portion cooperating with one another to define a cable channel that encircles the power-adapter opening, and
the rotating portion comprising first and second cable apertures connecting the power-adapter opening with the cable channel; and
installing the power-delivery system within the cable-management system by positioning the power adapter within the power-adapter opening and the first and second electrical cables respectively within the first and second cable apertures.

16. The method of cable management of claim 15, further comprising rotating, while the power-delivery system is installed within the cable-management system, the rotating portion with respect to the shell portion, wherein the rotating wraps the first and second electrical cables around the power-adapter opening within the cable channel.

17. The method of cable management of claim 16, wherein:
   the rotating portion comprises a rotating top and a rotating bottom; and
   the installing comprises (1) separating, prior to the positioning, the rotating top from the rotating bottom and (2) joining, after the positioning, the rotating top to the rotating bottom.

18. The method of cable management of claim 17, wherein the installing further comprises inserting or removing, after the separating and prior to the positioning, at least one of the one or more removable inserts to set a size of the power-adapter opening to fit the power adapter.

\* \* \* \* \*